United States Patent
Toda et al.

(10) Patent No.: US 8,478,100 B2
(45) Date of Patent: Jul. 2, 2013

(54) OPTICAL CABLE GRIPPING MEMBER

(75) Inventors: Yoshinobu Toda, Kanagawa (JP); Daizo Nishioka, Kanagawa (JP); Takayasu Yamauchi, Kanagawa (JP); Yukihiro Yokomachi, Kanagawa (JP); Kenichiro Ohtsuka, Kanagawa (JP); Keiichiro Sugimoto, Tokyo (JP); Shinichi Niwa, Tokyo (JP)

(73) Assignees: Sumitomo Electric Industries, Ltd., Osaka-shi, Osaka (JP); Nippon Telegraph and Telephone Corporation, Tokyo (JP)

(*) Notice: Subject to any disclaimer, the term of this patent is extended or adjusted under 35 U.S.C. 154(b) by 180 days.

(21) Appl. No.: 13/128,041

(22) PCT Filed: Oct. 15, 2009

(86) PCT No.: PCT/JP2009/067868
§ 371 (c)(1),
(2), (4) Date: Jul. 12, 2011

(87) PCT Pub. No.: WO2010/053003
PCT Pub. Date: May 14, 2010

(65) Prior Publication Data
US 2012/0128312 A1      May 24, 2012

(30) Foreign Application Priority Data
Nov. 10, 2008   (JP) ............................... P2008-287897

(51) Int. Cl.
*G02B 6/00*   (2006.01)
(52) U.S. Cl.
USPC ............................. 385/137; 385/135; 385/136

(58) Field of Classification Search
USPC .................................................. 385/135–137
See application file for complete search history.

(56) References Cited

U.S. PATENT DOCUMENTS

| 6,325,549 | B1* | 12/2001 | Shevchuk | 385/86 |
| 6,754,426 | B2* | 6/2004 | Lee et al. | 385/136 |
| 7,070,078 | B2* | 7/2006 | Song | 225/105 |
| 8,366,328 | B2* | 2/2013 | Chen et al. | 385/95 |
| 2006/0251374 | A1* | 11/2006 | Chou et al. | 385/136 |
| 2012/0128312 | A1* | 5/2012 | Toda et al. | 385/136 |

FOREIGN PATENT DOCUMENTS

| JP | 61-026702 | 8/1986 |
| JP | 10-224977 | 8/1998 |
| JP | 2004-109250 | 8/2004 |
| JP | 2007-240855 | 9/2007 |
| WO | 2006/019161 | 2/2006 |

* cited by examiner

*Primary Examiner* — Rhonda Peace
(74) *Attorney, Agent, or Firm* — Drinker Biddle & Reath LLP (57) ABSTRACT

An optical cable gripping member which prevents the kinds of splicing devices from being diversified, thereby enabling reduction of the labor of component management and lowering of the production cost to be realized is obtained. In a cable gripping member 5 which is to be attached to a splicing device 1 to hold an optical fiber cable 121 from its outer sheath, a spacer 17 which fills a gap between one inner wall surface 15a of a tubular space 15 through which the optical fiber cable 121 is to be passed, and the spacer 17 in the tubular space 15 is formed monolithically with one end of the one inner wall surface 15a in a manner that the spacer 17 is attachable to and detachable from the one inner wall surface 15a. The spacer 17 is attached to or detached from the one inner wall surface 15a, thereby enabling a plurality of optical fiber cables of different sizes to be held.

3 Claims, 8 Drawing Sheets

OPTICAL CABLE GRIPPING MEMBER

TECHNICAL FIELD

The present invention relates to an optical cable gripping member which is attached to a splicing device for connecting optical fibers to each other, and which grips an optical fiber cable from its outer sheath.

BACKGROUND ART

Recently, because of the rapid popularization of the Internet, a request for high speed data communication is increasing, and the FTTH (Fiber To The Home) service in which an optical fiber is laid to each home is expanding.

In the FTTH system, in an optical fiber connection closure which is suspended from a telephone pole or the like in the vicinity of the subscriber's home, a required number of cores (1 to 2 cores/subscriber's home) are drawn down from an aerial optical fiber cable, and the aerial optical fiber cable is connected to an optical fiber cable (drop cable) which is run into the subscriber's home.

As a splicing device which facilitates the on-site work of connection between optical fibers such as that between a drop cable and an aerial optical fiber cable, an optical connector in which a mechanical splice is employed in an optical connecting portion has been proposed.

In an optical connector disclosed in Patent Reference 1, for example, a mechanical splice which is placed in the tip end side, and an optical cable gripping member which is continuously joined with the rear end side of the mechanical splice through a coupling member to hold the outer sheath of an optical fiber cable inserted into the mechanical splice are housed in a connector housing.

PRIOR ART REFERENCE

Patent Reference

Patent Reference 1: WO2006/019161

SUMMARY OF THE INVENTION

Problems that the Invention is to Solve

In accordance with the recent expansion of the FTTH service, various drop cables of different outer sizes are produced. On the other hand, in a conventional optical connector for on-site connection, the dimensions of an optical cable gripping member for gripping and fixing an optical fiber cable are set dedicatedly for each of outer sizes of optical fiber cables. In the case where there are a plurality of kinds of to-be-connected drop cables having different outer sizes, therefore, a dedicated optical cable gripping member must be prepared for each of the outer sizes of the drop cables, thereby producing a problem in that, as the kinds of optical cable gripping members are more diversified, the labor of component management is further increased, and the production cost is further raised.

When an optical cable gripping member which is suitable for the outer size of a drop cable is to be selected at the site, furthermore, there arises a problem in that the work of determining the component of a suitable size increases the burden of the worker because a plurality of kinds of optical cable gripping members are similar in structure to one another, and therefore the field work is delayed.

It is an object of the invention to provide an optical cable gripping member which prevents the kinds of splicing devices for connecting optical fibers to each other from being diversified, thereby enabling reduction of the labor of component management, lowering of the production cost, and the like.

(1) In order to solve the problem, an optical cable gripping member according to the present invention is an optical cable gripping member which grips an optical fiber cable from an outer sheath of the optical fiber cable, the optical fiber cable being inserted into a splicing device for connecting optical fibers to each other, the optical cable gripping member comprising:

a gripping member body having a groove through which an optical fiber cable is to be passed;

a cover which covers an opening portion of the groove in a manner that the cover can open and close the opening portion of the groove; and a spacer which fills a gap between one inner wall surface of a tubular space that is defined by the cover and the groove, and the optical fiber cable located in the tubular space, wherein the spacer is formed monolithically with one end of the one inner wall surface of the tubular space in a manner that the spacer is attachable to and detachable from the one inner wall surface.

(2) In the optical cable gripping member according to (1), the spacer may swingably formed monolithically with one end of the one inner wall surface by a thin hinge which is extended from the one end of the one side wall.

(3) In the optical cable gripping member according to (2), an engaging unit which, when the spacer is swung by means of the thin hinge to be in a state where the spacer overlaps with the one inner wall surface, engagingly fixes the spacer to the one inner wall surface may be disposed.

Effects of the Invention

According to the optical cable gripping member of the invention, the size of the tubular space which is to grip the optical fiber cable can be adjusted depending on whether the spacer that is provided monolithically in the gripping member is used in a state where the spacer is attached to the one inner wall surface of the tubular space through which the optical fiber cable is to be passed, or in a state where the spacer is detached from the one inner wall surface, so that holding of two kinds of optical fiber cables of different outer sizes is enabled by the one optical cable gripping member.

The provision number of the spacer is not limited to singular. When a plurality of kinds of spacers of different sizes are provided monolithically in the gripping member body, for example, the size of the tubular space can be adjusted in a variety of manners by selecting a spacer to be attached to the inner wall surface of the tubular space, so that the member can be used for holding a larger number of kinds of optical fiber cables.

MODE FOR CARRYING OUT THE INVENTION

Hereinafter, examples of a preferred embodiment of the optical cable gripping member of the invention will be described in detail with reference to the drawings.

Figure 1:
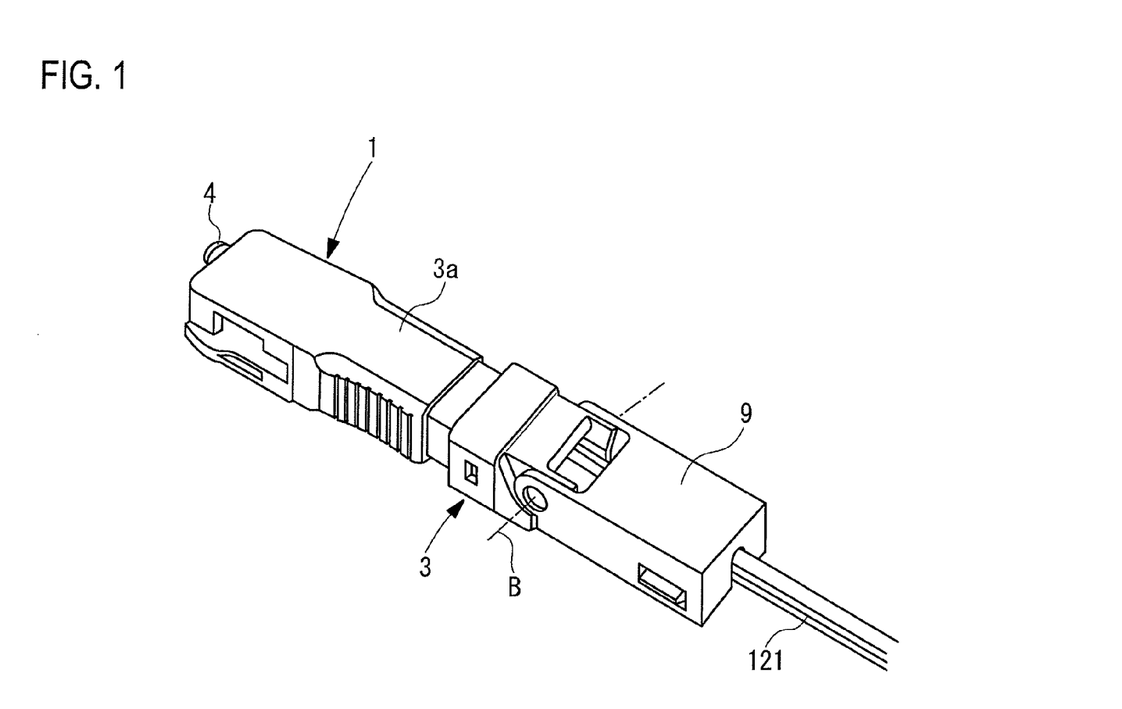
FIG. 1 is a perspective view of an embodiment of a splicing device in the invention.

A splicing device 1 shown in FIG. 1 is an embodiment of a splicing device (optical connector) to which the optical cable gripping member of the invention is to be attached, and an optical connector in which an optical ferrule 4 is housed inside a tip end side portion 3a of a connector housing 3.

In the rear end side of the connector housing 3, a gripping member housing portion 7 in which the optical cable gripping member 5 of the invention is to be housed is formed.

In the gripping member housing portion 7, the upper side is opened, and the opening portion 7a is opened and closed by an opening/closing cover 9.

Figure 2:
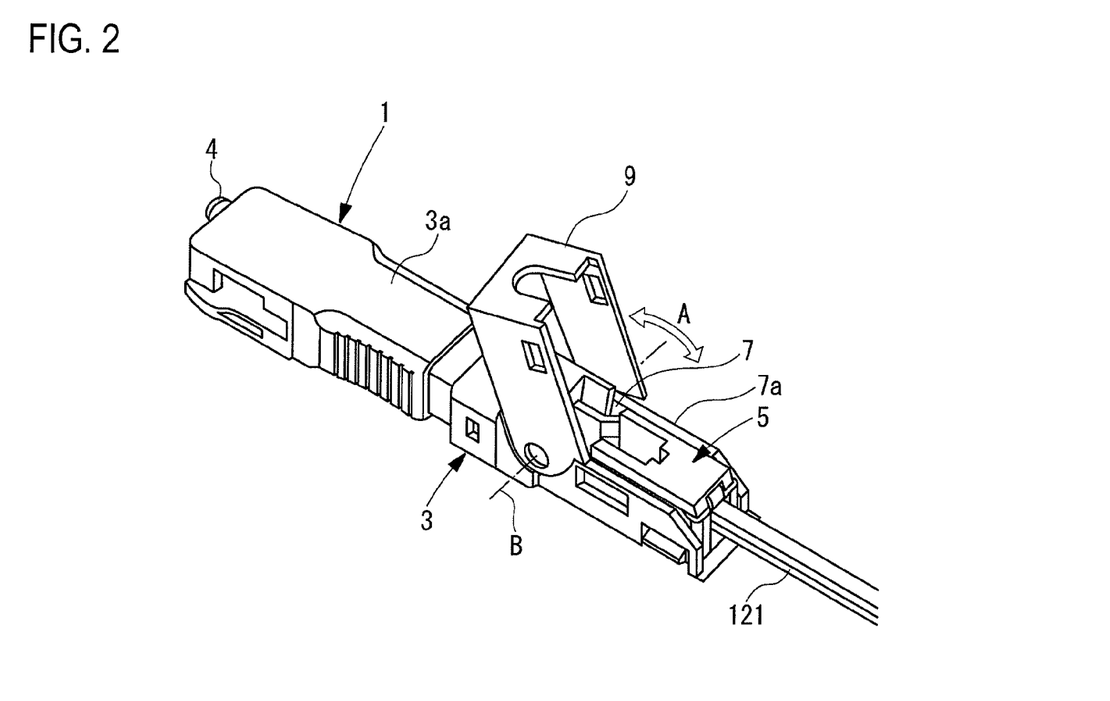
FIG. 2 is a perspective view of the splicing device showing an attachment state of a cable gripping member in FIG. 1.

The opening/closing cover 9 is swingably coupled at one end portion to the connector housing 3, and opens and closes the opening portion 7a by means of a swinging operation about a swing axis B as indicated by arrow A in FIG. 2.

The optical cable gripping member 5 of the embodiment is attached to the gripping member housing portion 7, and grips and fixes an optical fiber cable 121 from its outer sheath, the optical fiber cable being inserted into the connector housing 3 in order to be connected to a short optical fiber which is not shown, and which is drawn out from the optical ferrule 4, and prevents the optical fiber cable 121 from slipping off the connector housing 3.

Figure 3:
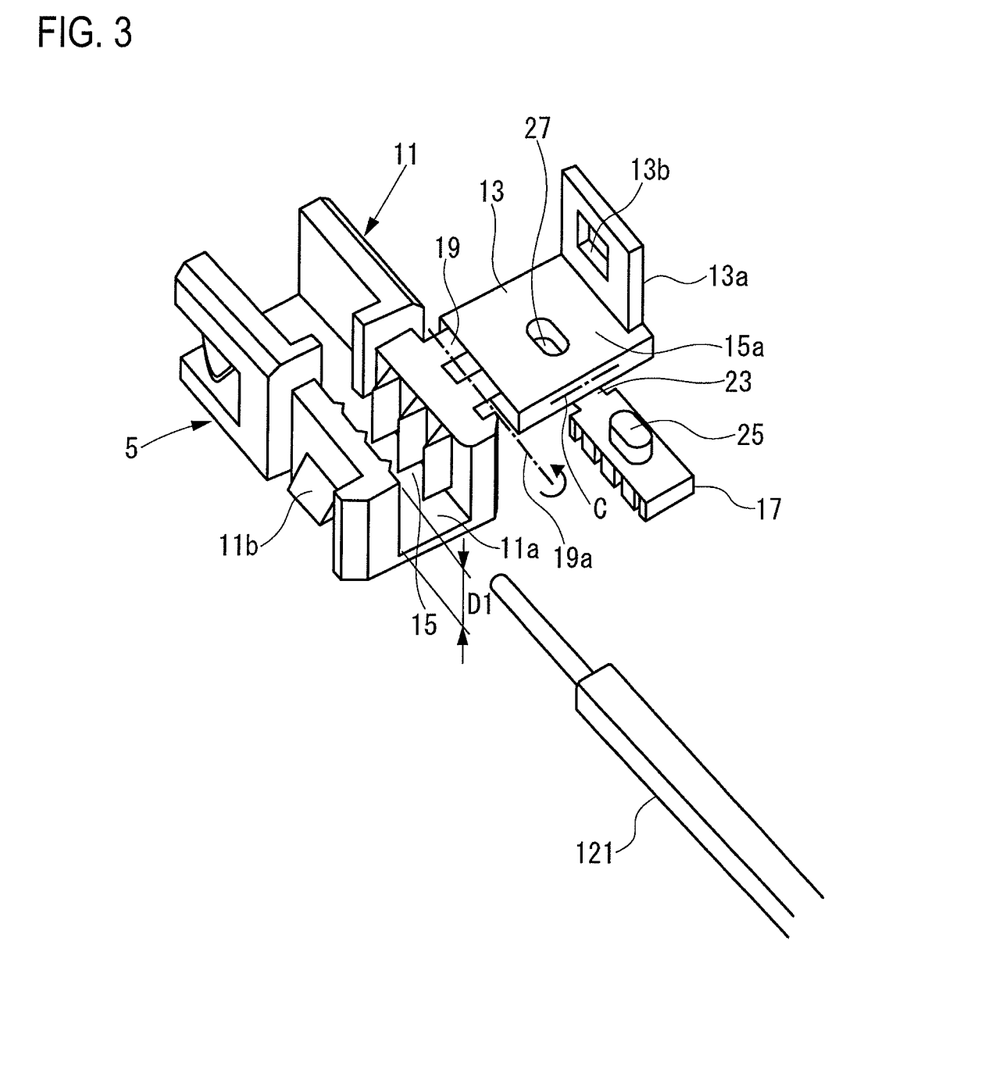
FIG. 3 is a perspective view of the optical cable gripping member in a state where a spacer in FIG. 2 is detached from one inner wall surface of a tubular space.

As shown in FIG. 3, the optical cable gripping member 5 includes: a gripping member body 11 in which a groove 11a through which the optical fiber cable 121 having the outer sheath is to be passed is formed; a cover 13 which covers the opening portion of the groove 11a in a manner that the cover 13 can open and close the opening portion of the groove 11a; and a spacer 17 which fills a gap between one inner wall surface 15a of a tubular space 15 that is defined by the cover 13 and the groove 11a, and the optical fiber cable 121 in the tubular space 15.

The optical cable gripping member 5 of the embodiment can grip two kinds of optical fiber cables having different heights (outer sizes). The depth D1 (see FIG. 3) of the groove 11a is set to be substantially equal to the height of the large-diameter optical fiber cable 121 having a larger height.

The cover 13 is formed monolithically with a thin hinge 19 which is extended from one side wall of the gripping member body 11, and opens and closes the opening portion of the groove 11a by means of a swinging operation of the thin hinge 19 about a swing axis 19a.

An engaging projecting piece 13a is extended from an end edge of the cover 13. An engaging hole 13b which, when the cover 13 is closed, is engaged with an engaging projection 11b that is projected from the outer side surface of the gripping member body 11 is disposed in the engaging projecting piece 13a.

Namely, when the cover 13 in the embodiment is set to the state where it closes the opening portion of the groove 11a, the engaging hole 13b of the engaging projecting piece 13a is engaged with the engaging projection 11b of the gripping member body 11, and the cover is locked to the state where it closes the groove 11a.

Figure 4:
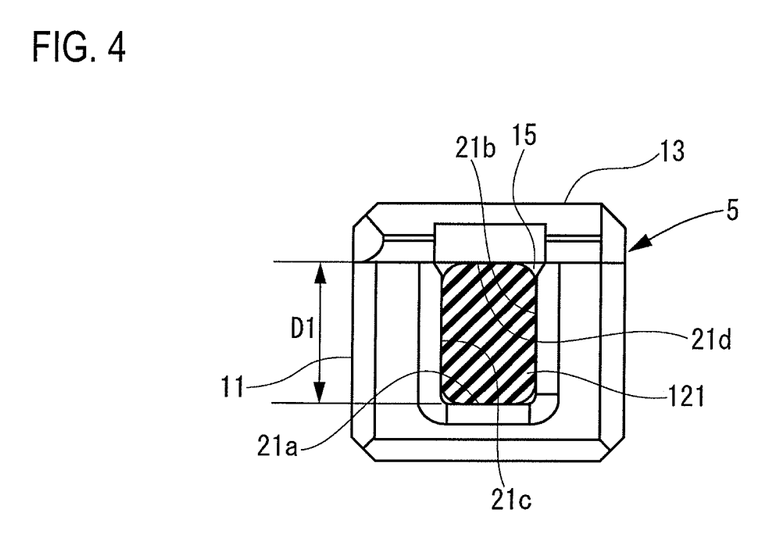
FIG. 4 is a front view of a state where the optical cable gripping member in FIG. 2 grips an optical fiber cable.

When the state where the cover 13 is closed is attained, as shown in FIG. 4, the tubular space 15 is formed as a rectangular tubular space by four inner wall surfaces of the bottom surface 21a of the groove 11a, the both side surfaces 21b, 21c of the groove 11a, and the inner surfaces 21d of the cover 13 covering the upper portion of the groove 11a.

In the case of the embodiment, among the four inner wall surfaces 21a to 21d constituting the tubular space 15, the inner surfaces 21d of the cover 13 is selected as the one inner wall surface 15a.

Then, the spacer 17 is formed monolithically with one end of the one inner wall surface 15a of the tubular space 15 so that the spacer is formed detachably with respect to the one inner wall surface 15a of the tubular space 15.

More specifically, the spacer 17 in the embodiment is swingably formed monolithically with one end of the cover 13 by a thin hinge 23 which is extended from one end of the cover 13 forming the one inner wall surface 15a.

The thin hinge 23 enables the spacer 17 to perform a swinging operation about a rotation axis C.

Figure 5:
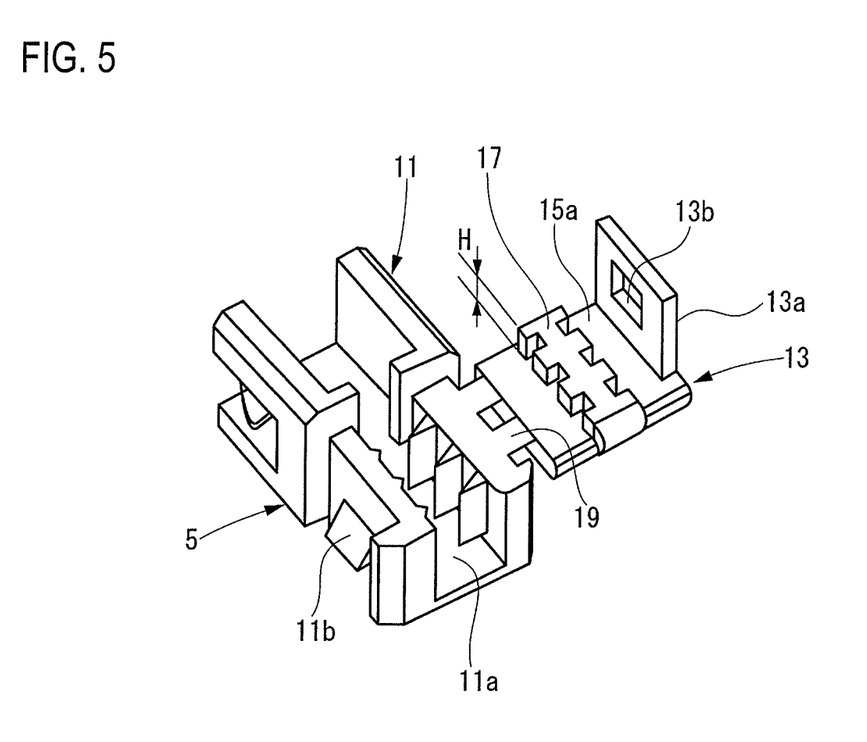
FIG. 5 is a perspective view of the optical cable gripping member in a state where the spacer in FIG. 3 is fitted and fixed to the one inner wall surface of the tubular space.

When the swinging operation about the rotation axis C by means of the thin hinge 23 causes the spacer 17 to be in a state where the spacer overlaps with the one inner wall surface 15a as shown in FIG. 5, an engaging projection 25 (see FIG. 3) projected from the spacer 17 is engaged with a recessed engaging portion 27 (see FIG. 3) formed in the one inner wall surface 15a, and fixed to the one inner wall surface 15a in an overlapping state.

The engaging projection 25 and the engaging portion 27 constitute the engaging unit in the invention. The engaging projection and the engaging portion are in a relative relationship, and hence may be formed in a positional relationship opposite to that in the embodiment.

Figure 6:
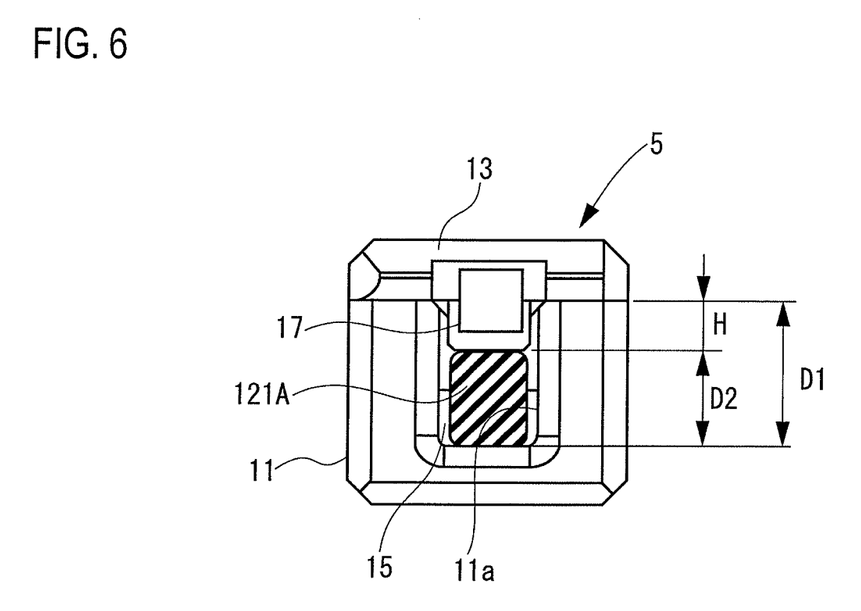
FIG. 6 is a front view of a state where the optical cable gripping member of FIG. 5 grips an optical fiber cable.

In the case of the embodiment, in a state where the spacer 17 overlaps with the one inner wall surface 15a as shown in FIGS. 5 and 6, the spacer is a projection which is projected by the height H from the one inner wall surface 15a.

In the case where the cover 13 is closed in the state where the spacer 17 overlaps with the one inner wall surface 15a, as shown in FIG. 6, the spacer 17 is projected by the dimension corresponding to the height H into the groove 11a, and hence the substantial depth of the groove 11a is equal to D2 shown in FIG. 6, so that a small-diameter optical fiber cable 121A having a low height which corresponds to the depth D2 can be gripped.

In the case where the optical fiber cable 121 having a height which is substantially equal to the original depth D1 of the groove 11a is to be gripped as shown in FIG. 4, the cover 13 is closed in a state where the spacer 17 does not overlap with the one inner wall surface 15a as shown in FIG. 3.

In this case, the thin hinge 23 may be previously cut off so that the spacer 17 is cut away from the cover 13.

In the above-described embodiment, the size of the tubular space 15 for gripping the optical fiber cable can be adjusted in either of two manners depending on whether the spacer 17 is used in the state where the spacer is detached from the one inner wall surface 15a as shown in FIG. 4, or in the state where the spacer is attached to the one inner wall surface 15a of the tubular space 15 through which the optical fiber cable 121A is passed as shown in FIG. 6, so that the two kinds of optical fiber cables 121, 121A of different outer sizes can be gripped and fixed by the one optical cable gripping member 5.

Even when the optical cable gripping member 5 is not changed in the splicing device 1 in accordance with the optical fiber cable, therefore, the splicing device can be versatilely used for the optical fiber cables 121, 121A of different outer sizes, and it is possible to prevent the kind of the optical cable gripping member 5 from being diversified, thereby enabling reduction of the labor of component management and lowering of the production cost.

Furthermore, one optical cable gripping member 5 can be versatilely used for the optical fiber cables 121, 121A of different outer sizes. As compared with the case where a dedicated optical cable gripping member is prepared for each of the outer sizes of optical fiber cables and an adapted optical cable gripping member that is selected and used on site, therefore, the work of determining the component or the like is eliminated, so that the burden of the worker can be reduced, and also the workability of the on-site work can be improved.

In the above-described embodiment, the spacer 17 is formed monolithically with the gripping member body 11, and therefore disadvantages such as slipping-off of the spacer 17 do not occur during storage or the like.

The fixation of the spacer 17 to the one inner wall surface 15a is attained by the engagement between the engaging projection 25 projected from the spacer 17 and the engaging portion 27 provided in the one inner wall surface 15a, and it is not necessary to use additional components such as screws. Therefore, the on-site work can be improved.

In the optical cable gripping member of the invention, the position of the one inner wall surface in which the spacer is provided is not limited to the inner surface of the cover 13 shown in the embodiment.

Figure 7:
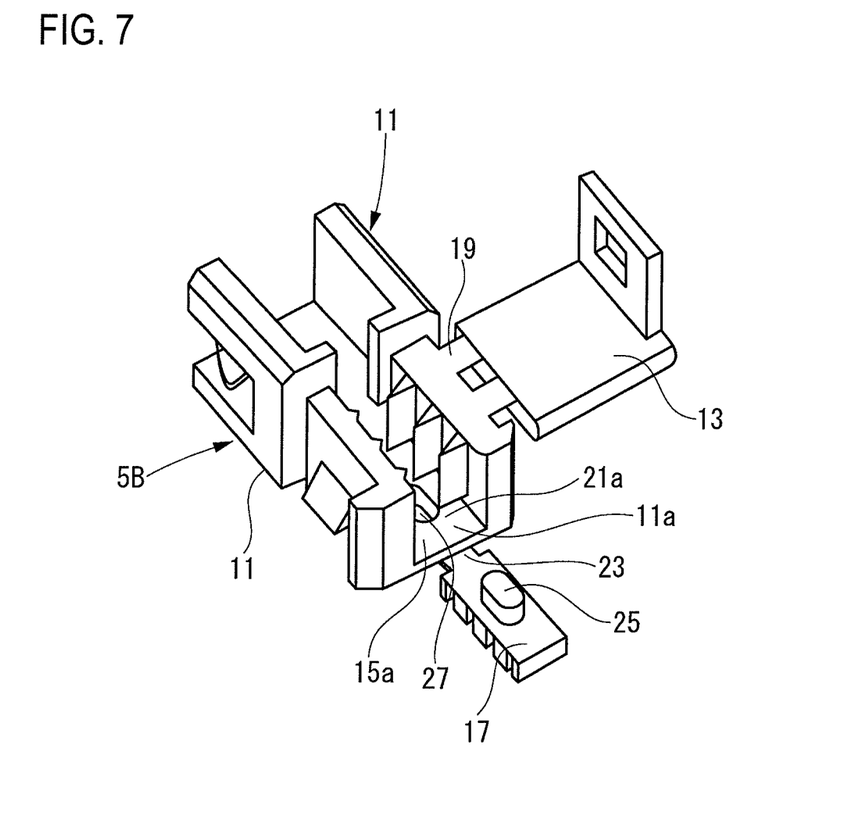
FIG. 7 is a perspective view of another embodiment of the optical cable gripping member of the invention.

For example, a configuration where, as shown in FIG. 7, the bottom surface 21a of the groove 11a of the gripping member body 11 is set in the one inner wall surface 15a with which the spacer 17 is formed monolithically may be employed.

Also in this case, the grippings of two kinds of optical fiber cables 121, 121A of different outer sizes are enabled depending on whether the spacer 17 is used in the state where the spacer is attached to the one inner wall surface 15a, or in the state where the spacer 17 is cut off from the one inner wall surface 15a.

Although not illustrated, it may be contemplated that the side surface 21b or side surface 21c of the groove 11a shown in FIG. 4 is set in the one inner wall surface 15a with which the spacer 17 is formed monolithically.

In this case, the provided spacer 17 has a configuration where the spacer is detachably monolithically provided on the side surface 21b or side surface 21c of the groove 11a, and the width of the tubular space 15 through which the optical fiber cable is passed can be adjusted.

The provision number of the spacer 17 is not limited to singular. When both the spacer 17 which is attachable to and detachable from the cover 13 as shown in FIG. 3, and the spacer 17 which is attachable to and detachable from the bottom surface 21a of the groove 11a as shown in FIG. 7 are provided, and the sizes (the height H shown in FIG. 5) of the spacers 17 are made different from each other, for example, the size of the tubular space 15 can be adjusted in four manners, so that four kinds of optical fiber cables having different sizes can be gripped.

A spacer which is attachable to and detachable from the side surfaces 21b, 21c of the groove 11a may be added, whereby the kinds of grippable optical fiber cables can be further increased.

Figure 8:
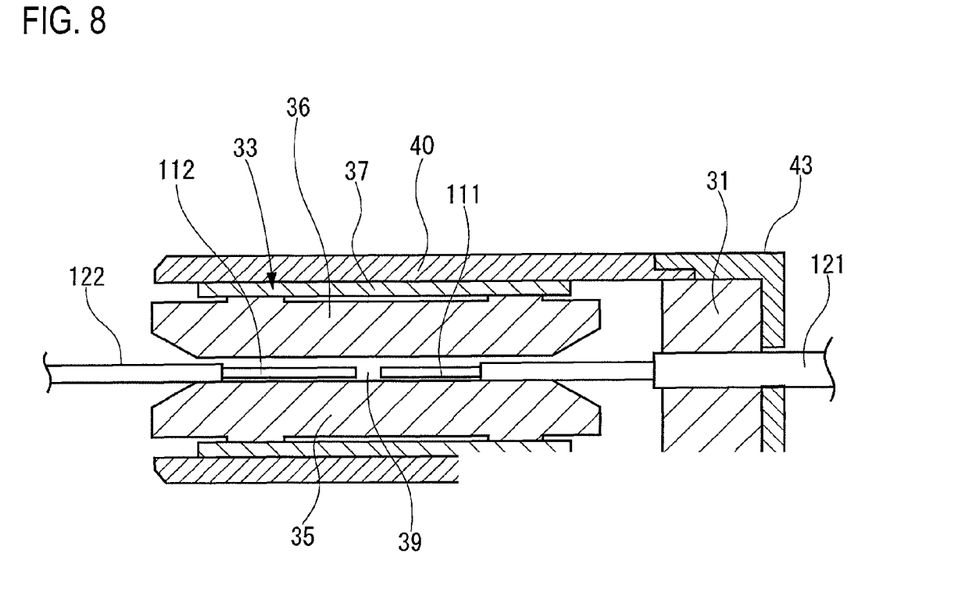
FIG. 8 is a sectional view of a further embodiment of the optical cable gripping member of the invention.

FIG. 8 is a sectional view of another embodiment of the optical cable gripping member of the invention.

In the embodiment, the optical cable gripping member 31 is disposed integrally with the mechanical splice 33 which connects optical fibers to each other.

The mechanical splice 33 includes: a base member 35; a cover member 36 which overlaps with the base member 35; and a clamp member 37 which presses and fixes the base member 35 and the cover member 36 in an overlapping state.

In the base member 35, an optical fiber holding groove 39 is formed which positions the tip ends of optical fibers 111, 112 that are exposed in end portions of a pair of optical fiber cables 121, 122 in a state where the tip ends are butted against each other.

The mechanical splice 33 clamps and fixes the pair of optical fiber cables 121, 122 which are inserted into the optical fiber holding groove 39, by means of the base member 35 and the cover member 36, to connect the pair of optical fibers 111, 112 to each other.

The pair of optical fibers 111, 112 are bare optical fibers which are exposed by peeling off the coating of the coated optical fiber cables 121, 122, respectively. The one of the optical fiber cables, i.e., the optical fiber cable 121 is used as a drop cable which is to be run into the subscriber's home.

The mechanical splice 33 has a configuration where the mechanical splice is housed in a housing 40, and the optical cable gripping member 31 housed in an outer-cover holder 43 is provided integrally with the rear end side of the mechanical splice 33. The outer-cover holder 43 is coupled with the housing 40.

The optical cable gripping member 31 has the same structure as that described in the above embodiment.

When, as in the embodiment, the simplified splicing device in which the optical cable gripping member 31 is simply provided integrally with the mechanical splice 33 is formed, a connecting portion of optical fibers can be miniaturized, and applied to a narrow place. Furthermore, the production cost can be lowered.

Although the invention has been described in detail and with reference to the specific embodiments, it is obvious to those skilled in the art that various changes and modifications can be made without departing from the spirit and scope of the invention. The application is based on Japanese Patent Application (No. 2008-287897) filed Nov. 10, 2008, and its disclosure is incorporated herein by reference.

DESCRIPTION OF REFERENCE NUMERALS AND SIGNS

1: splicing device (optical connector), 3: connector housing, 3a: tip end side portion, 5: optical cable gripping member, 7: gripping member housing portion, 7a: opening portion, 9: opening/closing cover, 11: gripping member body, 11a: groove, 11b: engaging projection, 13: cover, 15: tubular space, 15a: one inner wall surface, 17: spacer, 31: optical cable gripping member, 33: mechanical splice, 121, 121B: optical fiber cable

The invention claimed is:

1. An optical cable gripping member which grips an optical fiber cable from an outer sheath of the cable, the optical fiber cable being inserted into a splicing device for connecting optical fibers to each other, the optical cable gripping member comprising:

a gripping member body having a groove through which an optical fiber cable is to be passed;

a cover which covers an opening portion of the groove in a manner that the cover can open and close the opening portion of the groove; and a spacer which fills a gap between one inner wall surface of a tubular space that is defined by the cover and the groove, and the optical fiber cable located in the tubular space, wherein the spacer is formed monolithically with one end of the one inner wall surface of the tubular space in a manner that the spacer is attachable to and detachable from the one inner wall surface.

2. An optical cable gripping member according to claim 1, wherein the spacer is swingably formed monolithically with one end of the one inner wall surface by a thin hinge which is extended from the one end of the one side wall.

3. An optical cable gripping member according to claim 2, wherein an engaging unit which, when the spacer is swung by means of the thin hinge to be in a state where the spacer overlaps with the one inner wall surface, engagingly fixes the spacer to the one inner wall surface is disposed.

* * * * *